INVENTORS
DONALD JOHN CROSS &
CHARLES BAILEY NEAL

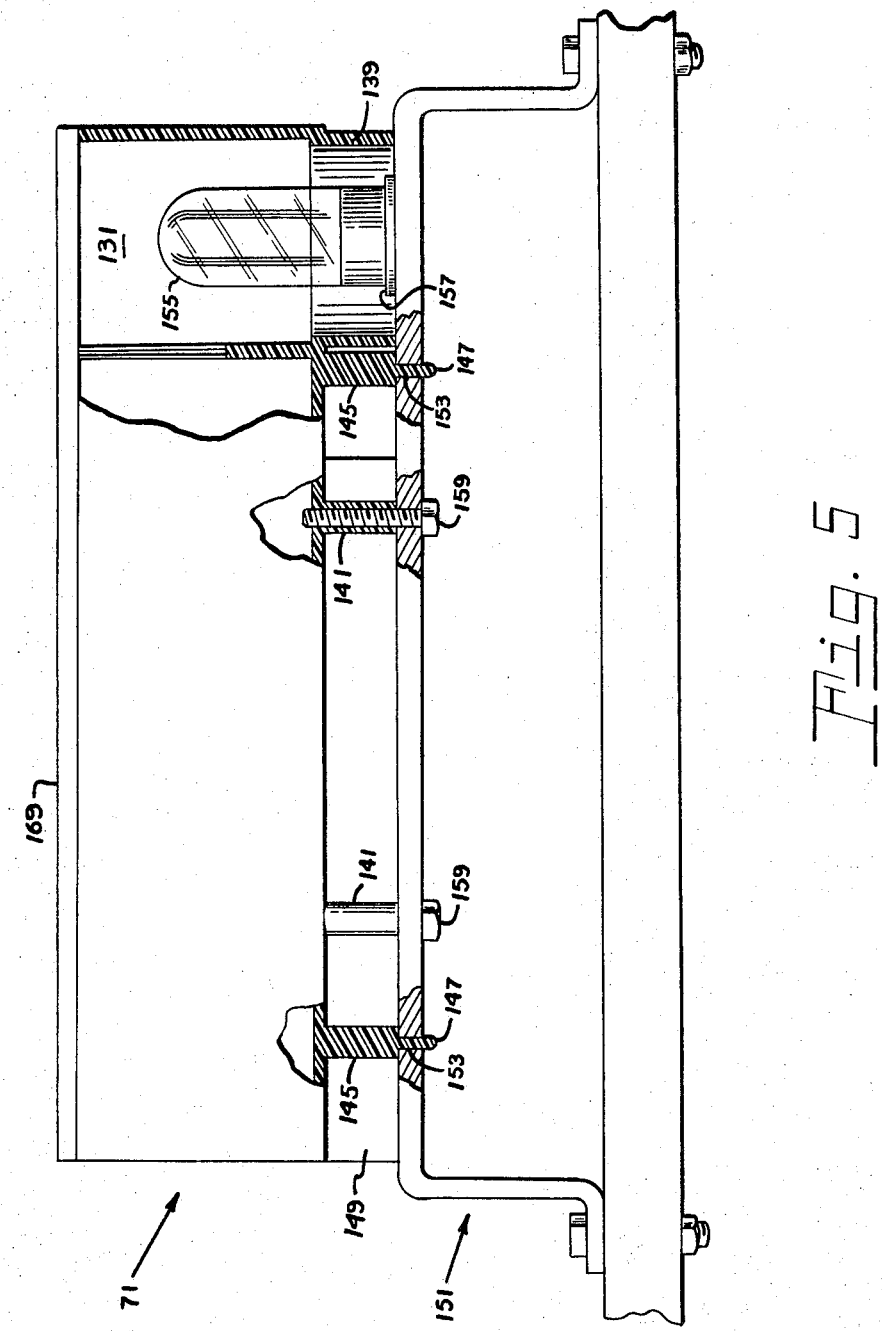

United States Patent Office 3,539,710
Patented Nov. 10, 1970

3,539,710
ELECTROOPTICAL COLOR REPRODUCTION SYSTEM AND MOUNTING MEANS THEREFOR
Donald John Cross, Tonawanda, and Charles Bailey Neal, Batavia, N.Y., assignors to Sylvania Electric Products, Inc., a corporation of Delaware
Filed June 4, 1968, Ser. No. 734,495
Int. Cl. H04n 1/08
U.S. Cl. 178—5.2                              13 Claims

ABSTRACT OF THE DISCLOSURE

A color reproduction system electrooptically scans a frame of film and includes an optical-to-electrical signal transducer to provide electrical signal components representative of the image on the film frame being scanned, which electrical signals are suitably translated and applied to a television receiver to provide an image display of the film. The optical-to-electrical signal transducer includes collecting lens, dichroic mirrors, secondary collecting lenses and suitable filters fixedly mounted in an airtight, dust-free, rigid container adapted to be mounted on a chassis incorporating photomultiplier pickup tubes in a manner to provide a fixed alignment system requiring no adjustments.

CROSS-REFERENCE TO RELATED APPLICATIONS

For a description of one system having signal processing equipment adapted to provide the necessary signal translation and circuitry to effect suitable control capable of utilizing the present invention, attention is directed to copending U.S. patent application Ser. No. 657,623, filed on Aug. 1, 1967, entitled, "Color Reproduction System," and assigned to the assignee of the present invention.

BACKGROUND OF THE INVENTION

A need has long existed for an improved consumer product capable of providing a visual display of photographic films. The present display devices for this purpose rely almost solely on optical projection systems, which have a number of inherent disadvantages. For example, a film optically projected generally requires a very low ambient light condition, which for the most part dictates using only in a darkened room, primarily at night time. Also because the film image is optically projected, there is no known acceptable means capable of compensating for slightly overexposed or slightly underexposed film. In addition the optical projection systems use high intensity lamps which generate a considerable amount of heat thereby requiring relatively complex and expensive compensation means to prevent film damage because of the heat exposure. The heat also tends to deform the film thereby requiring some sort of automatic focusing control if a suitable image display is to result.

From the point of view of working or operating in a relatively high ambient light condition and further of providing control means to compensate for slight degradations in film quality, a television receiver type of display has several significant advantages over an optical projection type of display system. However, all known apparatus for providing a televised display of a photographic film is found generally in the area of studio equipment, which is not readily available to the general public. Such studio equipment is extremely expensive, complex and relatively bulky.

It is therefore apparent that for practical reasons the typical studio type of equipment is not reasonably available to the general public. In order for such a product to be acceptable to the general public, it must not only be relatively inexpensive and uncomplicated, but additionally must be highly reliable inasmuch as the average person does not have the skills normally required to operate studio type equipment. Reliability and simplicity are further desirable, so that it will be within the capability of the average repairman to troubleshoot and correct any malfunction which might occur.

An additional desirable requirement from a practical point of view is that a television type of display also be capable of receiving normal television programs to reduce the effective cost of both systems to the consuming public.

In particular, for a film image to be displayed on a television receiver, there must be some sort of an optical-to-electrical transducer in the system capable of providing electrical signal outputs in response to an optical scanning of the film, which electrical signals are suitable for processing and subsequent application to the television receiver to provide a faithful reproduction of the image on the film frame. Quite obviously, the type of optical-to-electrical transducer system utilized in the commercial or studio equipment is not acceptable, since these transducer systems are quite expensive and very delicate both in alignment and maintaining of alignment.

OBJECTS AND SUMMARY OF THE INVENTION

Therefore, it is an object of this invention to provide an improved color reproduction system capable of displaying the image of a frame of film on a television receiver.

Another object of this invention is to provide such an improved color reproduction system which is both economical and reliable.

A particular object of this invention is to provide an economical and reliable optical-to-electrical transducer system for use in the aforementioned color reproduction system.

A still further object of the invention is to provide an economical and reliable optical-to-electrical transducer which requires minimal alignment and adjustments to establish and maintain satisfactory operation.

These and other objects and advantages are achieved in one aspect of the invention by a reproduction system utilizing an optical-to-electrical transducer mechanism wherein the optical components of the transducer are fixedly mounted and aligned in a light-tight, dust-free environment. The optical projection portion of the optical-to-electrical transducer is configured to permit relatively wide alignment tolerances, thereby permitting the utilization of relatively inexpensive optical and electrical components therein.

BRIEF DESCRIPTION OF THE DRAWINGS

FIG. 3 is a perspective side view of a retaining spring;

FIG. 5 is a side view partially in section of the optical-to-electrical transducer mounted to a chassis; and FIG. 6 is an enlarged partial frontal view of the photocathode of a photomultiplier.

DESCRIPTION OF THE PREFERRED EMBODIMENTS

For a better understanding of the present invention, together with other and further objects, advantages and capabilities thereof, reference is made to the following disclosure in connection with the above-described drawings.

Figure 1:
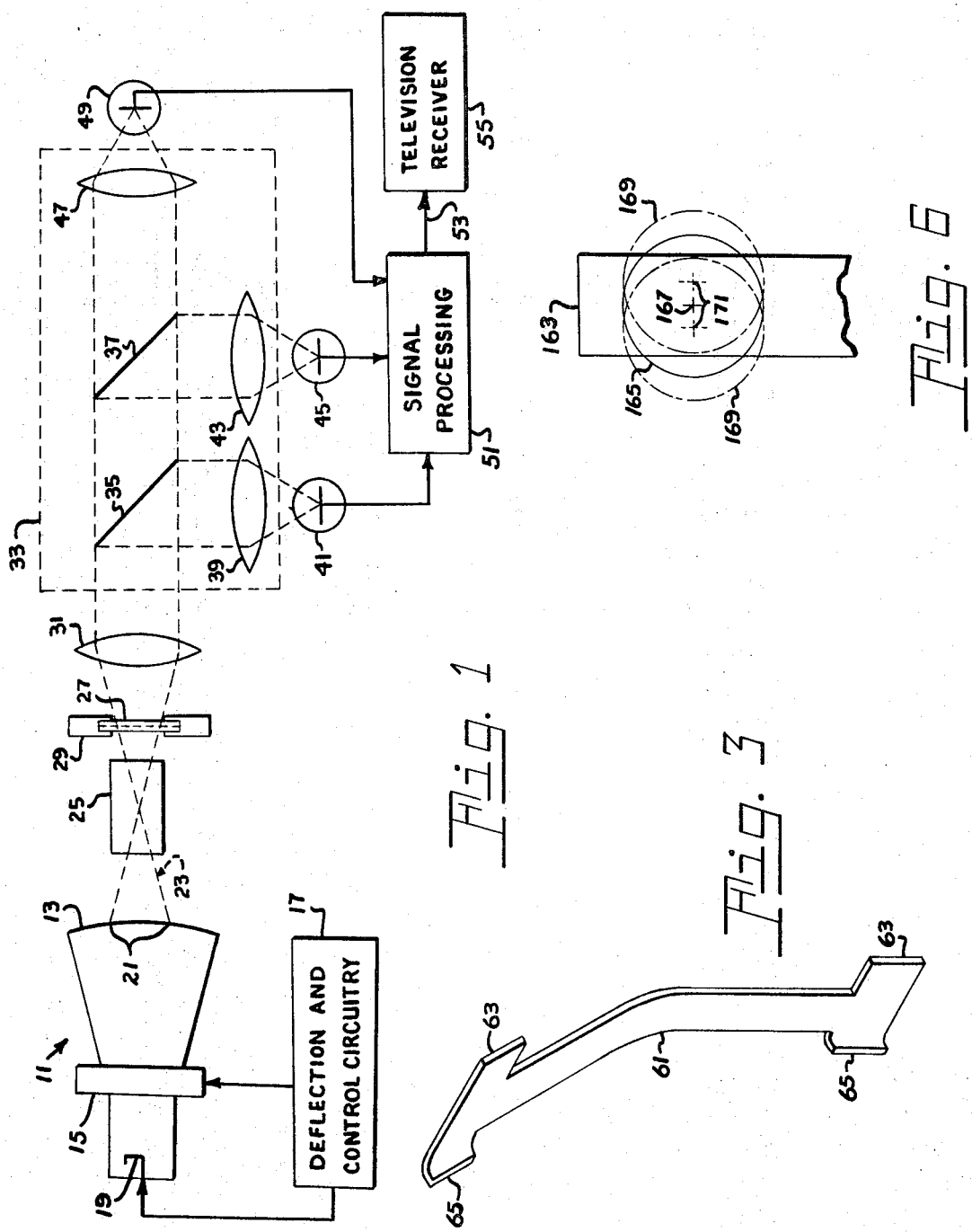
FIG. 1 is a diagrammatic illustration of the film reproduction system including one embodiment of the optical-to-electrical signal transducer of the invention.

Referring first to FIG. 1, the system includes a flying spot scanner cathode ray tube 11 having a curved faceplate 13. Mounted on the neck portion of the flying spot tube is a suitable deflection apparatus 15 to which are applied deflection and control signals from the deflection and control circuitry 17. Also the deflection and control circuitry provides a signal input to the cathode element 19 of the flying spot scanner tube. Generally only a small portion of the faceplate surface of the cathode ray tube is used to produce a moving beam of light 23. The moving beam of light 23 passes through an objective lens system 25 which operates to focus the moving light beam on a frame of film 27 contained in a suitable film holding mechanism 29. The beam of light which passes through the film 27 is collected by a primary condensing or collecting lens 31 and directed toward a light splitting system 33 which operates to break the beam of light down into its constituent color components or some portion thereof. As illustrated, the system 33 includes first and second dichroic mirrors 35 and 37. The dichroic mirror 35 selectively reflects one color component of the beam and directs it toward a secondary condensing or collecting lens 39 which collects the light of this color component and directs it towards a photosensitive pickup device 41, such as a photomultiplier tube. The remaining portion of the light incident on the dichroic mirror 35 passes therethrough and strikes the dichroic mirror 37. In similar fashion the dichroic mirror 37 selectively reflects a portion of the light representing a color component toward another secondary condensing or collecting lens 43 which directs the light therethrough toward a photosensitive pickup device 45. The remaining light passing through the dichroic mirror 37 is collected by yet another secondary condensing or collecting lens 47 which directs the light, representing a third color component of the image, toward a third photosensitive pickup device 49. The photosensitive pickup devices 41, 45 and 49 respond to the light intensities respectively incident thereon and produce electrical signal outputs bearing a fixed relation to the intensity of the light beams thereon incident. The electrical signal outputs from the photosensitive pickup devices are applied to suitable signal processing circuitry 51 which translates the received signals to produce output signals at 53 which are compatible with a television receiver 55 to permit reproduction thereby of the image on the film frame 27 being scanned. One type of signal processing equipment adapted to provide the necessary signal translation is shown and described in copending application S.N. 657,623, filed on Aug. 1, 1967, entitled, "Color Reproduction System," and assignee to the assignee of the present invention.

The flying spot scanner cathode ray tube 11 having a curved faceplate 13, represents a preferred embodiment of the invention since it is possible to fabricate the tube using a standard glass envelope thereby affecting a considerable economy in the cost of the tube. Furthermore, even though the curved faceplate of the tube produces a spherical aberration, it has been found that there are available relatively inexpensive objective lens systems 25, which also produces a spherical aberration, but the spherical aberration of the lens is substantially complementary to the spherical aberration produced by the curved faceplate of the scanner tube, resulting in a relatively uniform focusing of light beam from the tube over the scanned area of the film. Obviously, however, the more expensive flying spot scanner cathode ray tubes having a flat, highly polished faceplate may be used in the system, but because of their added expense and the fact that they require relatively expensive objective lens systems to provide uniform focusing over the scanned area of the film, as mentioned above, the preferred tube is that illustrated in FIG. 1.

Figure 2:
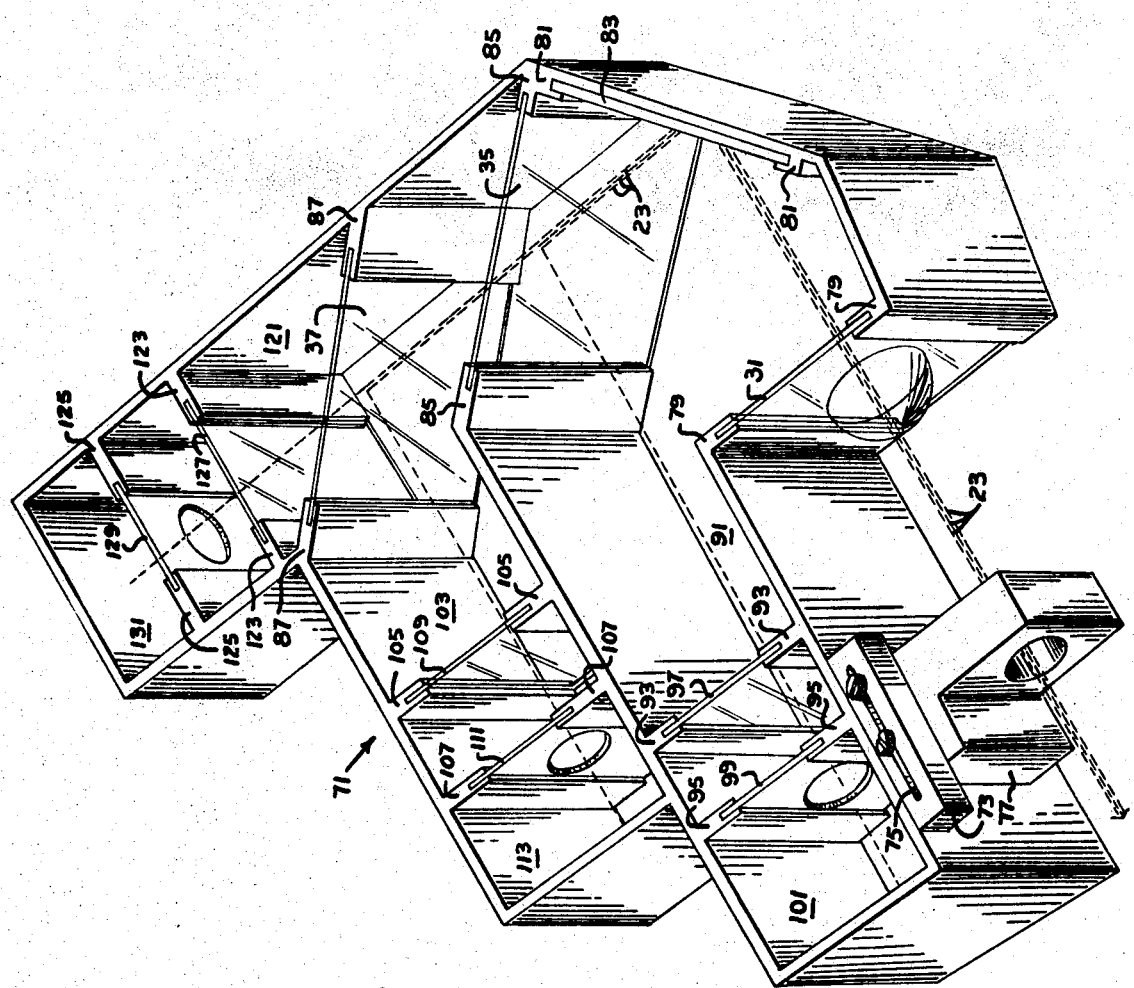
FIG. 2 is a top perspective view of one embodiment of the optical portion of the optical-to-electrical signal transducer according to the present invention.

The optics of the system illustrated in the perspective view of FIG. 2 includes a multisided structure 71 having a mounting bracket 73 affixed to one side thereof including a lateral slot opening 75 therein adapted to provide means for securing the objective lens holder 77 to the system. The slot 75 is configured to permit movement of the objective lens in only one direction. The collecting lens 31 is inserted into channeled support members 79 in another side of the structure 71, so that the condensing lens 31 is substantially perpendicular to the incoming light rays 23. A second pair of channeled support members 81 are adapted to secure a highly reflective mirror 83 in a position which is at a substantially 45° angle to the incoming light rays 23. The first dichroic mirror 35 is inserted in channeled support members 85 configured to maintain the dichroic mirror at approximately a right angle with the reflective mirror 83, and at a substantially 45° angle from the light rays 23 reflected from the mirror 83. The second dichroic mirror 37 is similarly mounted in the structure by support members 87, holding it substantially parallel to the first dichroic mirror 35 and at about a 45° angle with the incident light ray 23. A first rectilinear compartment 91 includes two pairs of slotted channels 93, 95 adapted to fixedly support, respectively, a secondary condensing or collecting lens 97 and a color bandpass filter 99. The compartment 91 is structured to support the secondary collecting lens and the filter in a manner such that the light ray 23 from the dichroic mirror 35 is substantially perpendicular to the lens and filter. The compartment 91 also includes a section 101 behind the filter 99 adapted to receive a photomultiplier tube (not shown). A second compartment 103 is similarly configured to include first and second channeled support means 105 and 107, adapted to support a secondary condensing or collecting lens 109 and a color bandpass filter 111 in a manner such that the beam of light passing through the dichroic mirror 35 and reflected from the dichroic mirror 37 is perpendicular to the lens and filter. The compartment 103 also includes a section 113 behind the filter 111 adapted to receive a photomultiplier tube (not shown). The third compartmented section 121 of the system also includes channeled support members 123 and 125, positioned to support a secondary condensing or collecting lens 127 and a color bandpass filter 129 in a manner such that the light which passes through both dichroic mirrors 35, 37 is perpendicular to the surface of the collecting lens 127 and the filter 129. Also contained therein is a compartment 131 adapted to receive a third photomultiplier tube (not shown).

The compartmented structure 71 is built to be relatively airtight and dust-tight. A cover (not shown) is adapted to fit on the top of the structure to affect a seal around the top edges thereof. In addition the top enclosure will serve to retain the respective lenses, mirrors, and filters contained therein.

In order to assure that the lenses, mirrors and/or filters are securely mounted in the structure 71, it may be desirable to use additional spring bias means, such as the retaining spring 61 illustrated in FIG. 3. The spring is an elongated member formed to have a resilient bend along its longitudinal dimension and having tabs 63 at each end. A portion 65 of each tab is curved to provide additional support. After the lenses, mirrors or filters are positioned in the slotted channels, e.g. 85, a retaining spring 61 is inserted in each slot behind the mirror so that the resilient bend in the spring fixedly supports the mirror in one direction, e.g., prevents back and forth motion, and the curved portions 65 of the end tabs 63 fixedly support the mirror in the other direction, e.g., prevent left to right motion.

It will be readily apparent that many variations may be made in the structure of FIG. 2 without departing from the teaching and scope of the invention. For example, the dichroic mirrors 35, 37 are shown as being positioned at substantially 45° angles with the light reflected from the mirror 83. However, this angle may be varied for one or both of the dichroic mirrors 35, 37 depending on the particular light separation characteristics of the mirrors. Also, the objective lens holder 75 need not be connected to the side of the structure 71, and further if the light from the condensing lens 31 is directly incident on the first dichroic mirror 35 in the manner illustrated in FIG. 1, it is not necessary to have a highly reflective mirror 83 in the system. The configuration of FIG. 2 uses such a reflective lens primarily to provide an optical system which affords certain economies in the packaging of the system. The particular type of support means used to mount the lenses, mirrors and filters in the system is subject to wide variation and may therefore differ depending upon particular requirements or design preferances.

Figure 4:
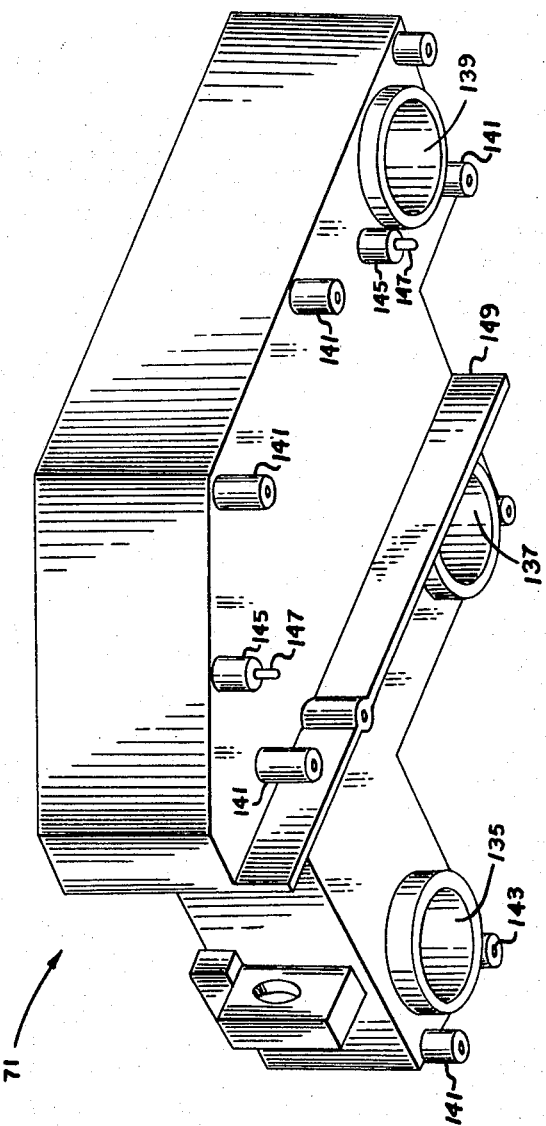
FIG. 4 is a bottom perspective view of the optical portion of the optical-to-electrical signal transducer of FIG. 2.

The bottom perspective view of the compartmented structure 71 illustrated in FIG. 4 shows more clearly the openings 135, 137 and 139, contained in the respective sections of the compartmented structures 101, 113 and 131 adapted to be inserted over respective photomultiplier tubes, or other suitable photosensitive pickup devices. The bottom portion of the structure 71 contains a plurality of cylindrical support studs 141 having threadable openings 143 therein adapted to receive a suitable fastening device. The bottom of the structure also includes at least two stud portions 145 having alignment pins 147, which are utilized to assure proper alignment of the structure 71 with a chassis, for example, upon which are mounted suitable photomultiplier tubes or other photosensitive pickup devices. This aspect of the structure is more clearly shown in the side view illustrated in FIG. 5. The base of the structure 71 may also include one or more beam-like structural supports 149 to insure structural rigidity of the system.

As shown in FIG. 5, the compartmented structure 71 is adapted to be securely mounted and aligned on a chassis 151, which may, for example, be the chassis of the signal processing unit 51 shown in FIG. 1. The support studs 141 and the structural support 149 contact the upper surface of the chassis 151. The alignment pins 147 of the studs 145 pass through openings 153 in the chassis tops. The positioning and tolerances of the openings 153 are carefully controlled to insure proper alignment of the optical equipment in the compartmented structure 71 with the photomultiplier tubes, e.g. 155, which are accurately positioned in sockets, e.g. 157, mounted on the chassis 151. The photomultiplier tube 155 extends through its respective opening 139 in the structure 71 as do the remaining photomultiplier tubes (not shown). The structure 71 is secured to the chassis 151 by a plurality of fastening means 159, e.g. bolts or screws, extending into the threadable openings of the support studs 141. Since the openings 135, 137 and 139 intimately contact the chassis 151 and the cover 169 securely seals the top opening of the structure 71, the overall compartmented structure is light tight and relatively dust free.

FIG. 6 is an enlarged frontal view of the photocathode 163 of a photomultiplier tube illustrating the manner in which the light beam 165 is projected thereon. The photocathode is elongated having one dimension which exceeds the diameter of the light beam and a second dimension which is less than the diameter of the light beam. As shown, the photocathode encompasses the light beam 165 in the vertical direction with equal portions of the light beam overlapping the edges of the photocathode in the horizontal direction; the center 167 of the light beam coinciding with the vertical center of the photocathode. Utilizing this configuration, it is possible to maintain satisfactory operation, even though the impinging light beam 169, due to some misalignment in the system, has its center 171 displaced to the left or right of the vertical center 167 of the photocathode 163, since essentially the same amount of light is still incident upon the photocathode. Therefore, wider tolerances are permissible in mounting the lenses and mirrors in the optical structure 71.

The structure 71 illustrated in FIGS. 2, 4 and 5 may be made as an integral unit, for example, of molded plastic or diecast metal. Because if the system simplicity and the relatively wide tolerances permissible therein, the structure 71 lends itself readily to mass production techniques, thereby affecting desirable system economies.

It is, therefore, apparent that applicants have provided an optical scan and optical-to-electrical transducer in a color reproduction system which is highly reliable and economical. The optical system utilizing fixed mounting of optical components requires minimal alignment and is relatively maintainence free.

While there have been shown and described what are at present considered the preferred embodiments of the invention, it will be obvious to those skilled in the art that various changes and modifications may be made therein without departing from the scope of the invention as defined by the appended claims.

What is claimed is:

1. In a color reproduction system adapted to display the image from a frame of film on a television receiver wherein said frame of film is scanned by a moving beam of light, and wherein the information derived from said film is processed electrically and adapted to be applied to the television receiver, an optical to electrical transducer operative in conjunction with said moving beam of light to optically derive information from said frame of film and convert said optical information into electrical signals adapted to be processed by signal processing equipment and applied to said television receiver for display of the scanned image on said frame of film, said optical-to-electrical transducer comprising:

means for providing the moving beam of light;

an objective lens positioned between the frame of film and said means for providing the moving beam of light, said objective lens being mated to said beam of light to provide relatively uniform focusing of the beam over the area of the film scanned by the beam;

a plurality of photosensitive pickup devices each having a photosensitive area therein, operative in response to incident light thereon to produce an electrical signal output which varies in amplitude in a predetermined relation with the intensity of light incident on the photosensitive surface;

an enclosed structure having a plurality of compartments, each of said compartments including support members and a secondary condensing lens mounted in said support members and each compartment including an opening adapted to receive one of said photosensitive pickup devices whereby light passing through the respective secondary condensing lens is incident on the photosensitive area of the photosensitive device contained therein;

means including at least one dichroic mirror fixedly mounted in said structure for separating said beam of light into a plurality of like beams representing a plurality of distinct color components, said dichroic mirror positioned to intercept at a predetermined angle the beam of light passing through the frame of film and operative to selectively reflect a first light beam of said plurality of light beams representing a first color component toward a first compartment of said plurality of compartments and to pass the remainder of said beam of light through to the remaining ones of said plurality of compartments;

means fixedly mounting said plurality of photosensitive pickup devices one in each of the openings in said plurality of compartments whereby light beams, each representing a distinct color component, entering each of said compartments are incident, respectively, on the photosensitive areas of the respective photosensitive pickup devices; and means coupling the electrical signal outputs of said plurality of photosensitive pickup devices to the signal processing equipment for signal processing and application to the television receiver, whereby the scanning of the frame of film by said moving beam of light produces a display on the receiver of the image in said frame of film.

2. The invention according to claim 1 additionally comprising a primary condensing lens fixedly positioned between the frame of film and said means for separating said beam of light.

3. The invention according to claim 1 additionally comprising a color bandpass filter fixedly mounted in said first compartment between the secondary condensing lens and the opening adapted to receive a photosensitive pickup device.

4. The invention according to claim 1 wherein said dichroic mirror is fixedly mounted in said structure by means of a pair of oppositely disposed channeled support members into which said dichroic mirror is adapted to be inserted.

5. The invention according to claim 4 additionally comprising a pair of resilient spring retaining means each inserted, respectively, into one of said pair of oppositely disposed channeled support members between an end of said dichroic mirror and an end and side of the channel.

6. In a color reproduction system adapted to display the image from a frame of film on a television receiver wherein said frame of film is scanned by a beam of light emanating from the faceplate of a flying spot scanner tube, and wherein the information derived from said film is to be processed electrically by signal processing equipment and applied to the television receiver, an optical-to-electrical transducer operative to derive optical information from said frame of film and convert said optical information into electrical information, said optical-to-electrical transducer comprising:

an objective lens positioned between the frame of film and the faceplate of said flying spot scanner tube, said objective lens operative to provide relatively uniform focusing of the beam over the area of the film scanned by the beam;

first, second and third photomutliplier tubes, each having a photocathode operative in response to incident light thereon to produce an electrical signal output which varies in amplitude in relation to the intensity of light incident on the photocathode;

a chassis for the signal processing equipment including three sockets accurately mounted thereon in predetermined positions adapted to support respectively said first, second and third photomutliplier tubes;

a multisided boxed structure including first, second and third compartments each including a pair of support members and an opening in the base thereof adapted to accept a photomultiplier tube;

a primary condensing lens fixedly mounted in said structure and positioned to intercept and collect the beam of light passing through said frame of film;

first and second dichroic mirrors fixedly mounted in said structure; said first dichroic mirror positioned at a predetermined location to intercept the light passing through said primary condensing lens and to selectively reflect a first color component thereof toward said first compartment and to pass the remainder of the light; said second dichroic mirror positioned at a predetermined angle to intercept the light passing through said first dichroic mirror and to selectively reflect a second color component thereof toward said second compartment and to pass a remaining third color component thereof toward said third compartment;

first, second and third condensing lens fixedly mounted, respectively, in the first, second and third compartments of said structure;

means for rigidly securing said structure to said chassis such that said first, second and third photomultiplier tubes pass through the respective openings in the first, second and third compartments of said structure with their photocathodes in proper alignment to intercept the respective color components of light passing through said first, second and third secondary condensing lenses; and means coupling the respective electrical signal outputs from said photomultiplier tubes to said signal processing equipment.

7. The invention according to claim 6 additionally comprising first, second and third bandpass filters mounted respectively in the first, second and third compartments of said structure between the respective secondary condensing lens and the opening adapted to accept a photomultiplier tube.

8. The invention according to claim 6 wherein said objective lens is secured to one side of said structure and includes adjustment means permitting movement of said objective lens in a line defined between the center of the scanned area of the flying spot scanner tube faceplate and the center of the primary condensing lens.

9. The invention according to claim 6 additionally comprising a highly reflective mirror fixedly mounted in said structure and positioned therein so that the light passing through said primary condensing lens strikes the highly reflective mirror and is reflected toward said first dichroic mirror.

10. The invention according to claim 6 additionally comprising a top cover for said structure and including means for securely fastening said cover to the top of said structure to provide a relatively airtight, dust free enclosure.

11. The invention according to claim 6, wherein said structure additionally includes a plurality of alignment pins protruding from the underside of the structure, and wherein said chassis includes a like plurality of accurately positioned openings in the top thereof each adapted to receive a respective one of said plurality of alignment pins to thereby assure accurate alignment of said structure on said chassis.

12. The invention according to claim 6, wherein said structure is an integral unit formed of molded plastic material.

13. The invention according to claim 6, wherein said structure is an integral unit formed of a die-cast metal.

References Cited

UNITED STATES PATENTS

| | | | |
|---|---|---|---|
| 2,318,118 | 5/1943 | Warner et al. | 178—5.6 |
| 3,002,048 | 9/1961 | Bailey et al. | |
| 3,005,042 | 10/1961 | Horsley. | |
| 3,008,001 | 11/1961 | Reith. | |
| 3,128,333 | 4/1964 | Loughlin | |
| 3,459,885 | 8/1969 | Goldmark et al. | |

RICHARD MURRAY, Primary Examiner

R. P. LANGE, Assistant Examiner

U.S. Cl. X.R.

178—5.4, 6.7